(12) United States Patent
Honl

(10) Patent No.: US 7,978,971 B1
(45) Date of Patent: Jul. 12, 2011

(54) COLLAPSIBLE SOFTBOX FOR PHOTOGRAPHY LIGHTING

(76) Inventor: David Honl, Burbank, CA (US)

( * ) Notice: Subject to any disclaimer, the term of this patent is extended or adjusted under 35 U.S.C. 154(b) by 0 days.

(21) Appl. No.: 12/661,954

(22) Filed: Mar. 26, 2010

(51) Int. Cl.
*G03B 15/03* (2006.01)

(52) U.S. Cl. .................................... 396/198; 396/200

(58) Field of Classification Search ............. 396/4, 175, 396/198, 200, 544; 362/16–18
See application file for complete search history.

(56) References Cited

U.S. PATENT DOCUMENTS

| | | | | |
|---|---|---|---|---|
| 2,326,004 | A * | 8/1943 | Barrett | 359/359 |
| 5,311,409 | A * | 5/1994 | King | 362/17 |
| 5,347,432 | A * | 9/1994 | Chiavetta | 362/18 |
| 7,360,909 | B1 * | 4/2008 | Hughes | 362/18 |
| 7,399,097 | B1 * | 7/2008 | DeLaPaz | 362/18 |
| 2005/0088836 | A1 * | 4/2005 | Lowe | 362/18 |

OTHER PUBLICATIONS

Amazon.com: Photoflex XT20XTXS LiteDome Q39, et al.; http://www.amazon.com/Photoflex-XT2OXTXS-LiteDome-Extra-Small/sim/B00009UT0B/2; website screen print dated Mar. 2, 2010; 2 pages.
Chimera PRO II Banks; http://www.chimeralighting.com/dsp-Product.asp?productid=10; website screen print dated Mar. 2, 2010; 2 pages.
LumiQuest Photographic Softbox III (LQ-119); http://www.lumiquest.com/products/softbox-iii.htm; website screen print dated Mar. 2, 2010; 1 page.
Photoflex on Camera XTC; http://www.photoflex.com/Photoflex_Products/On_Camera_XTC/index.html; website screen print dated Mar. 2, 2010; 1 page.
Wescott Pro Photography and Video Lighting 5ft. Octabank; http://www.fjwestcott.com/products/product.cfm?itemnum=36628tbl=products&head=softbox; website screen print dated Mar. 2, 2010; 2 pages.

* cited by examiner

*Primary Examiner* — W. B. Perkey
(74) *Attorney, Agent, or Firm* — Martin & Ferraro, LLP

(57) ABSTRACT

A collapsible softbox for use with a photographic flash. The softbox includes a collapsible body made of connected, moveable first and second side panels. The body includes a distal opening and a proximal opening. The softbox also includes a front panel which is detachably engageable to the distal end of the body.

25 Claims, 4 Drawing Sheets

COLLAPSIBLE SOFTBOX FOR PHOTOGRAPHY LIGHTING

BACKGROUND OF THE INVENTION

1. Field of the Invention

The present invention relates to improvements in devices designed to create soft, even lighting conditions for photographic purposes by directing light through a diffusing material.

2. Description of the Related Art

Photographers commonly use softboxes with large AC powered studio flash units to create soft, even light by directing the light from the flash units through a diffusing material. Studio softboxes are generally made of a black cloth lined with a reflective surface on the inside thereof. The cloth is then stretched or draped over either four or eight rods attached to a connecting ring to create a rectangular or octagonal-shaped box, respectively.

With the advent and increasing popularity of reliable, portable, battery powered flash units; the need for small, lightweight, portable light control devices has increased. The currently available portable softboxes are rectangular in shape and are either rigid-walled, inflatable, or use the same type of connecting rod and ring system as the large studio models. The rigid-walled and rod-based designs can be cumbersome, are not easily stowed for transport, and may be easily bent or deformed. In addition, the inflatable designs are subject to puncture. Furthermore, the linear shape of the softbox produces a distracting matching catchlight in the subject's eyes. Accordingly, there exists a need to provide a softbox with improved portability and durability that produces a more desirable catchlight in the subject's eyes.

The present invention seeks to alleviate one or more of these problems by providing a softbox that eliminates the need for inflexible rigid walls or rods, without requiring inflation, and simultaneously producing a curved catchlight.

SUMMARY OF THE INVENTION

The present invention in one preferred embodiment is drawn to a collapsible softbox for use with a portable light source, such as a shoe mount flash, to create a softened, more even light for photographic purposes. In one preferred embodiment, the softbox is generally frusto-conical and has an opening at both ends. The larger opening is covered with a removable, light diffusing front panel and the smaller opening is attached to the flash. The softbox has side panels that may collapse toward each other when the front panel is removed, allowing the softbox to be easily stored and transported.

In another preferred embodiment, the present invention is drawn to a collapsible softbox for use with a photographic flash. The softbox includes a body having a first side panel and a second side panel. The first and second side panels are connected together, with the first and second side panels being moveable from a collapsed position wherein the first and second side panels are substantially flat to an expanded position wherein the first and second side panels are at least in part curved. The body has a distal opening and a proximal opening in the expanded position, the distal opening having a curved perimeter in the expanded position. The softbox further includes a front panel having a curved perimeter, the front panel being detachably engageable with the perimeter of the distal opening of the body. The front panel, with the curved perimeter of the front panel engaged to a majority of the perimeter of the distal opening, maintains the body in the expanded position.

In a further preferred embodiment, the present invention is drawn to a collapsible softbox for use with a photographic flash, the softbox including a body having opposed hinges connecting first and second portions. The first and second portions are moveable from a collapsed position wherein the first and second portions are substantially flat to an expanded position wherein the first and second portions are at least in part curved. The body has a distal opening and a proximal opening in the expanded position, the distal opening having a curved perimeter in the expanded position. The softbox further includes a front panel having a curved perimeter, the front panel being detachably engageable with the perimeter of the distal opening of the body. The front panel when engaged to a majority of the perimeter of the distal opening maintains the body in the expanded position.

In yet another preferred embodiment, the present invention includes a method for softening the flash from a camera, the method including expanding a body of a softbox from a collapsed position wherein the body is substantially flat to an expanded position wherein the body forms a generally frusto-conical shape with an open distal end and an open proximal end that is smaller than the distal end; removeably engaging a front panel to the distal end so that once the front panel is attached to the body, the body is maintained in the expanded position; and removeably engaging the proximal end of the body to a structure housing the flash.

In another preferred embodiment, the front panel may be permanently attached and the softbox may include an internal conical helix, allowing the front and back to be collapsed toward each other for storage and transportation.

The front panel of the softbox may be round or elliptical to create a more appealing rounded catchlight.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DETAILED DESCRIPTION OF THE DRAWINGS

Figure 1:
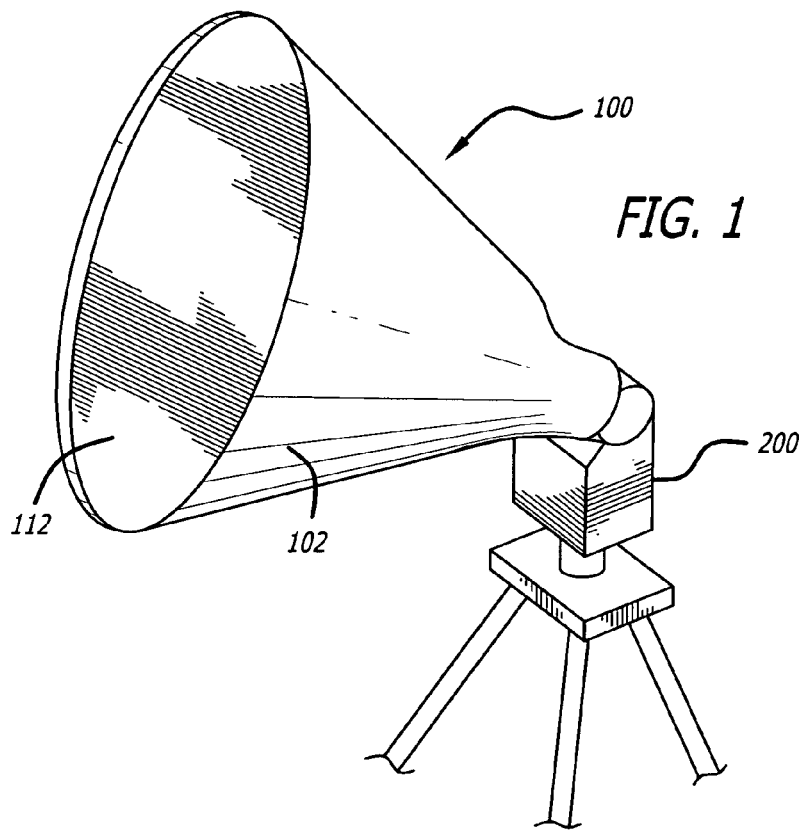
FIG. 1 is a perspective view of a softbox in accordance with a preferred embodiment of the present invention shown detachably engaged with a photographic flash housing.

Reference will now be made in detail to the present preferred embodiments of the invention, examples of which are illustrated in the accompanying drawings.

FIGS. 1 to 7 show a preferred embodiment of a collapsible softbox 100 detachably engageable to a flash housing 200. In this preferred embodiment, softbox 100 includes a body 102 and a front panel 112. Softbox 100 is preferably configured to be detachably attached to a light source, such as flash housing 200, to soften the light from a photographic flash 202. The preferred elements of softbox 100 and their interrelationship are described below.

Figure 2:
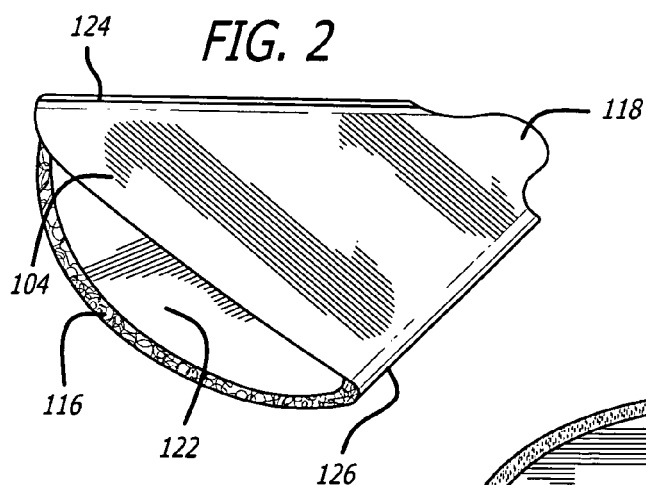
FIG. 2 is a perspective view of a body the softbox of FIG. 1 shown in a collapsed position.
Figure 4:
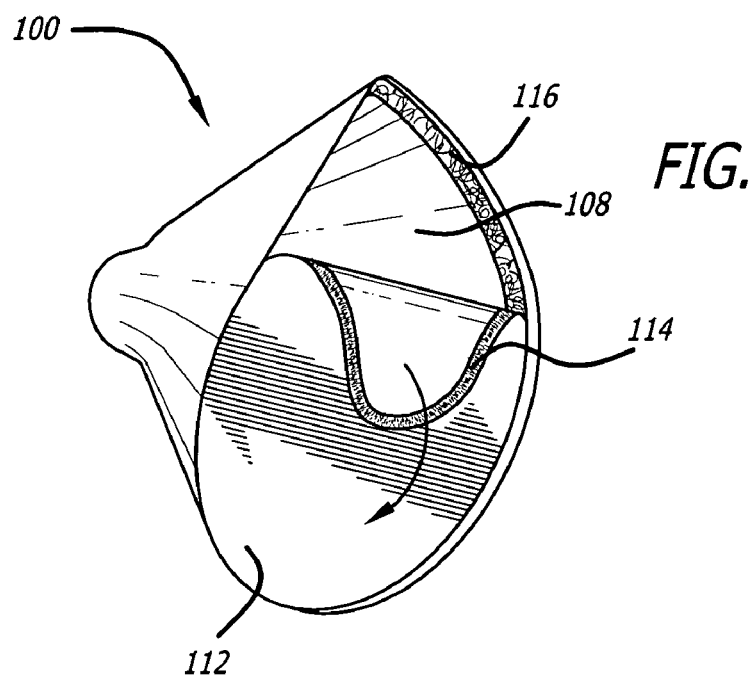
FIG. 4 is a perspective view of the softbox of FIG. 1 showing the front panel being removed from the body.
Figure 7:
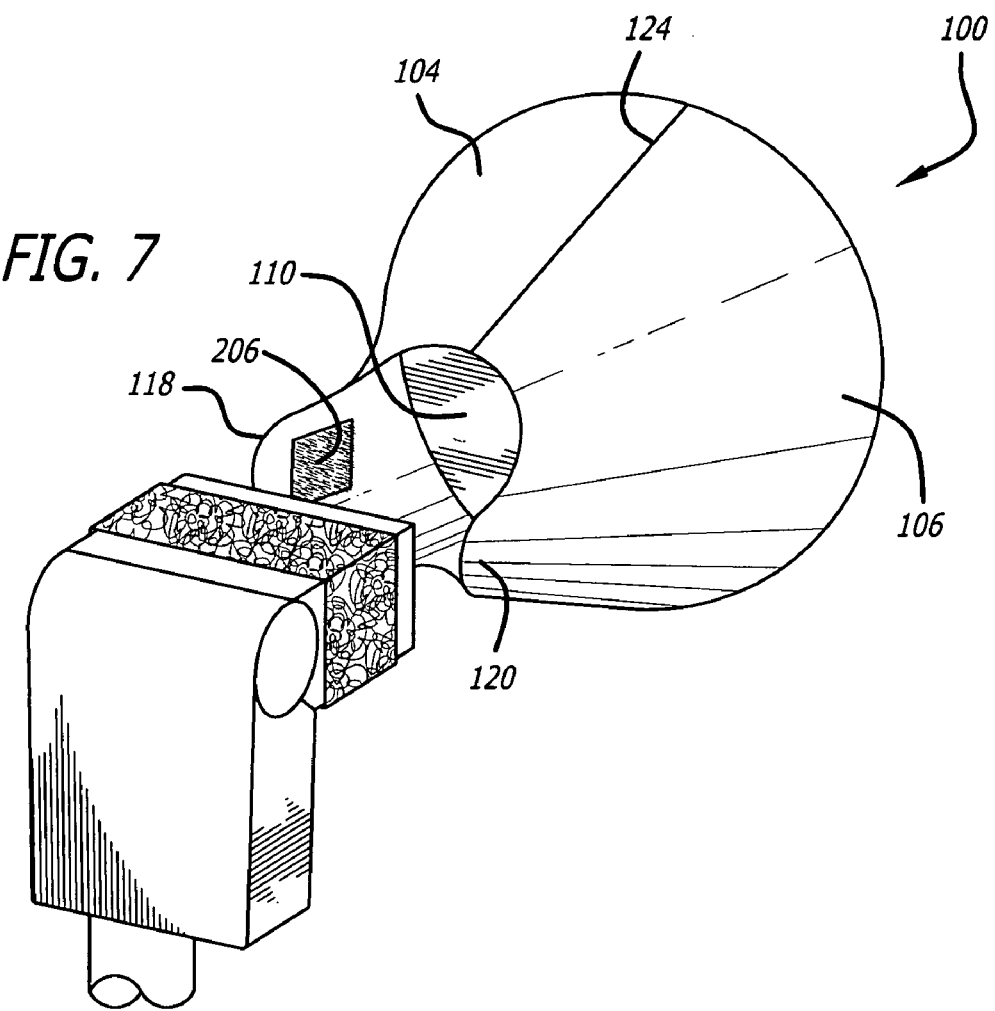
FIG. 7 is a rear perspective view of the softbox and flash housing of FIG. 1.

Referring to FIGS. 1, 2, 4, and 7, body 102 of softbox 100 includes a first side panel 104, a second side panel 106, a distal opening 108, and a proximal opening 110. First and second side panels 104 and 106 are preferably connected to each other to form a hinge 124 at the top of body 102 and a hinge 126 at the bottom of body 102. Hinges 124 and 126 may be a living hinge or a sewn seam. First and second side panels 104 and 106 may connected in other ways without departing from the scope of the present invention. First and second side panels 104 and 106 are moveable from a collapsed position, as shown in FIG. 2, to an expanded position, as shown in FIGS. 1, 4, and 7. In the collapsed position, side panels 104, 106 are generally flat to minimize the size of softbox 100 to facilitate storage. In the expanded position, first side panel 104 and second side panel 106 are preferably at least in part curved, and distal opening 108 preferably has a curved perimeter. In the preferred embodiment, softbox 100 forms a conical shape in the expanded position.

First and second side panels 104 and 106 are preferably constructed of three layers; an inner layer, a middle layer, and an outer layer. Preferably, the middle layer is more rigid than the inner and outer layers. The middle layer is preferably rigid enough to hold its shape, but flexible enough to allow it to be bent or folded and still resume its original form. The inner layer may include an interior surface 122, shown in FIG. 2. Preferably, interior surface 122 is reflective.

Figure 3:
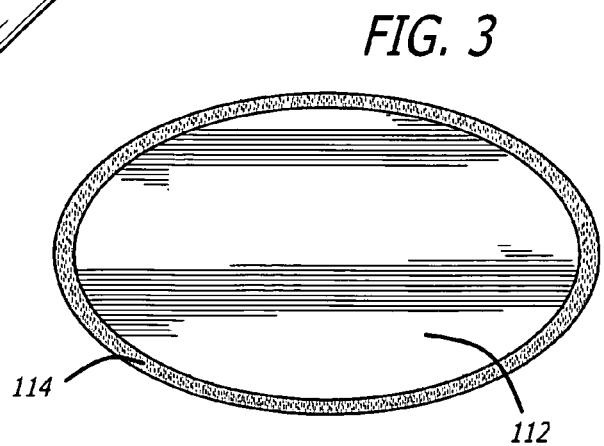
FIG. 3 is a perspective view of a front panel of the softbox of FIG. 1.

As shown in FIGS. 1, 3, and 4, softbox 100 includes a front panel 112. Front panel 112 has a curved perimeter that preferably matches the curved perimeter of distal opening 108. Preferably, the perimeters of front panel 112 and distal opening 108 are round and include cooperative hook and loop fasteners 114 and 116, respectively. The cooperative engagement of hook and loop fasteners 114 and 116 forms a ring. The ring, when connected by the cooperative engagement of hook and loop fasteners 114 and 116 to the curved perimeter of distal opening 108, provides support to maintain the expanded position of body 102. The width of fastener 116 is preferably wider than fastener 114 to facilitate easier installation of front panel 112. Front panel 112 is preferably made of a flexible, translucent fabric or other material suitable for the intended purpose.

Front panel 112 is preferably flexible, and therefore need not itself provide a positive, rigid structural support to maintain the expanded position of softbox 100. When front panel 112 is attached at diametrically opposite points of distal opening 108, the portion of front panel 112 connecting the opposite points prevents separation of side panels 104, 106 beyond the diameter of front panel 112. The attaching of front panel 112 at diametrically opposite points along the perimeter of distal opening 108 shapes the distal opening into the circular shape of front panel 112 and effectively distributes the force required to maintain the expanded position of body 102 along the perimeter of distal opening 108. This effect is most noticeable in the embodiment of FIG. 1 where front panel 112 is engaged by fasteners 114, 116 to the perimeter of distal opening 108 at opposed hinges 124, 126. For example, if an attempt were made to compress softbox 100 while in the expanded position, the points around the perimeter of front panel 112 and distal opening 108, particularly those points perpendicular to the force of compression, would be the most likely to "bow out." However, this tendency to "bow out" is countered by the resistance to separation by the diameter of front panel 112, which is preferably made of a non-stretchable material, between opposed points along the perimeter of front panel 112, to help maintain the expanded position of softbox 100.

The degree of flexibility of the middle layer of side panels 104, 106 also functions to maintain softbox 100 in the expanded position. Side panels 104, 106 flex to form a curve when attached to front panel 112 in the expanded position. The forces of side panels 104, 106 to return to a normal, unflexed state are resisted by front panel 112 secured to perimeter of opening 108.

To effectively maintain softbox 100 in the expanded position, it is not necessary to have fasteners continuously around the entire perimeter of front panel 112 and distal opening 108. For example only, where the fasteners include a plurality of snaps, the snaps can be evenly spaced about the perimeter. To maximize the effect of an even distribution of fasteners (whether continuous or spaced), a circular shape is preferred at distal opening 108 of body 102, and front panel 112. Other ways of fastening front panel 112 to body 102 include the use of a zipper and/or magnets or other fasteners. Many advantages flow from the arrangement of fasteners as discussed above. For example only, no support rods or inflexible support structures are needed to maintain the softbox in the expanded position, permitting the softbox to be stowed in a compact fashion. Additionally, the set up of the softbox is more quickly facilitated by the absence of a complicated assembly of support pieces.

Figure 5:
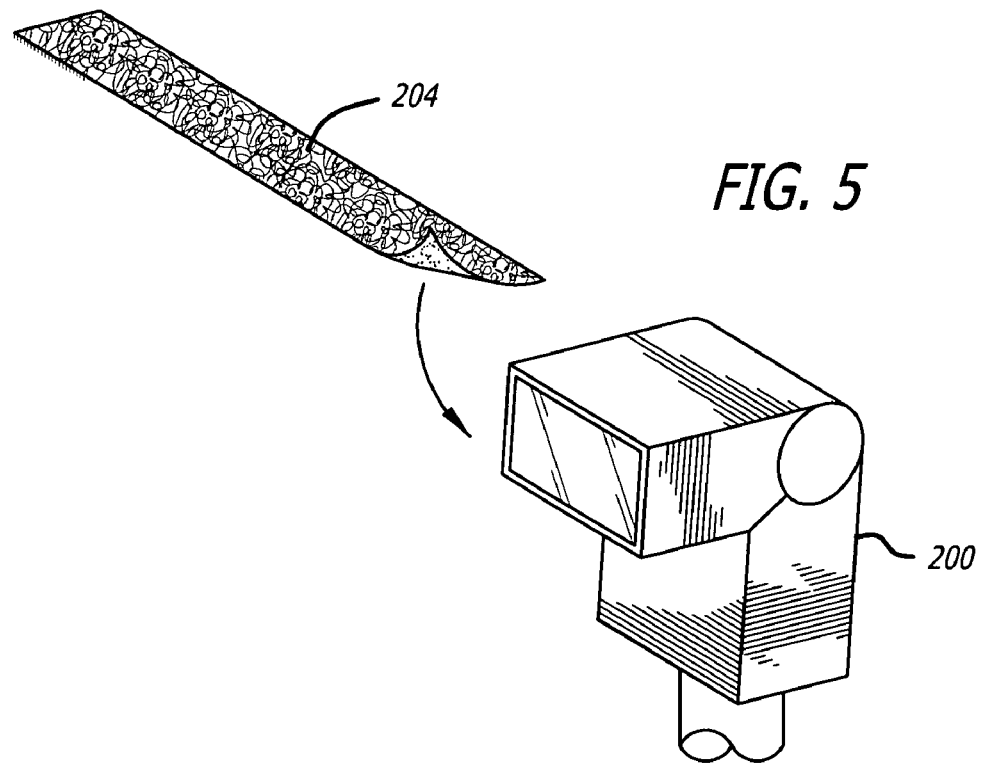
FIG. 5 is a perspective view of the flash housing of FIG. 1 having a hook and loop fastener strap detachably engaged thereto.
Figure 6:
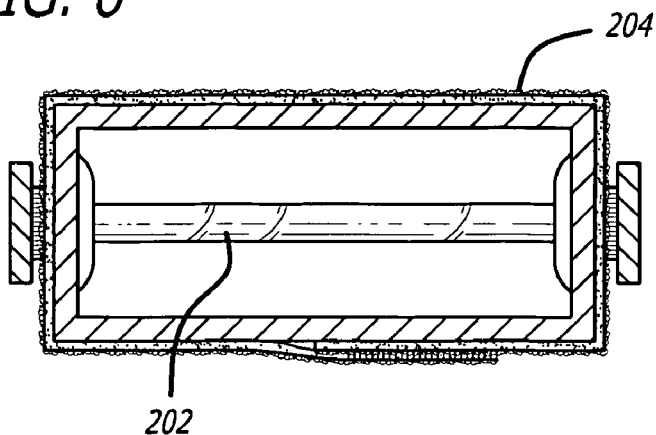
FIG. 6 is a front elevation view of the flash housing and hook and loop fastener strap of FIG. 5 shown engaged to one another.

FIG. 5 shows flash housing 200 having a hook and loop fastener strap 204 being detachably engaged thereto. FIG. 6 shows fastener strap 204 engaged to flash housing 200, and a photographic flash 202 contained therein.

Referring to FIG. 7, a tab 118 extends from first side panel 104, and an opposed tab 120 extends from second side panel 106. On the interior surfaces of tabs 118 and 120 are hook and loop fasteners 206 which cooperatively engage hook and loop fastener strap 204. The cooperative engagement of fasteners 204 and 206 permits detachable engagement of softbox 100 with housing 200.

Figure 8:
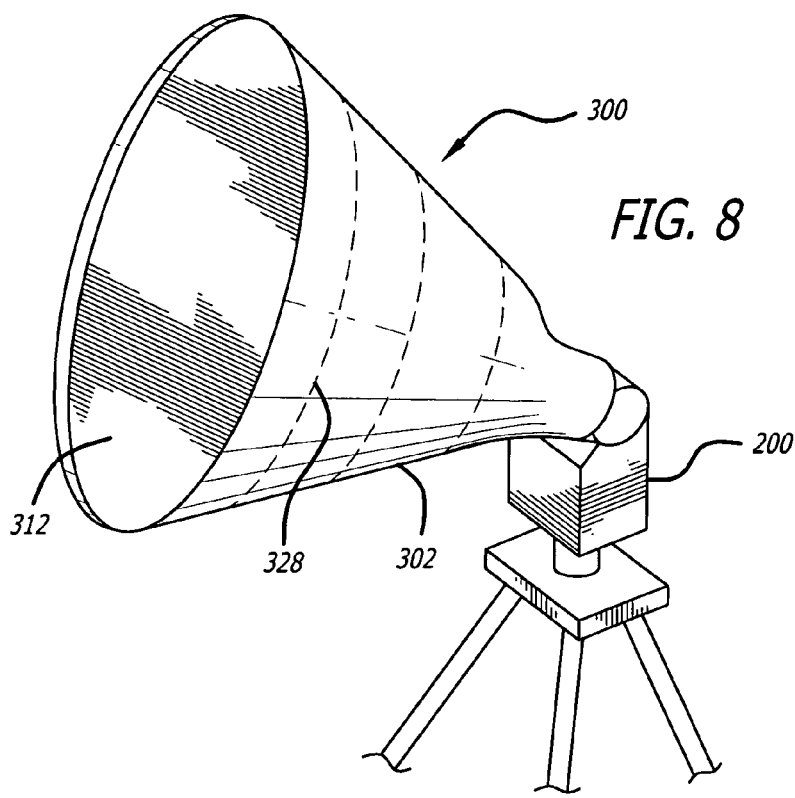
FIG. 8 is a perspective view of a softbox in accordance with another preferred embodiment of the present invention shown detachably engaged with the photographic flash housing.
Figure 9:
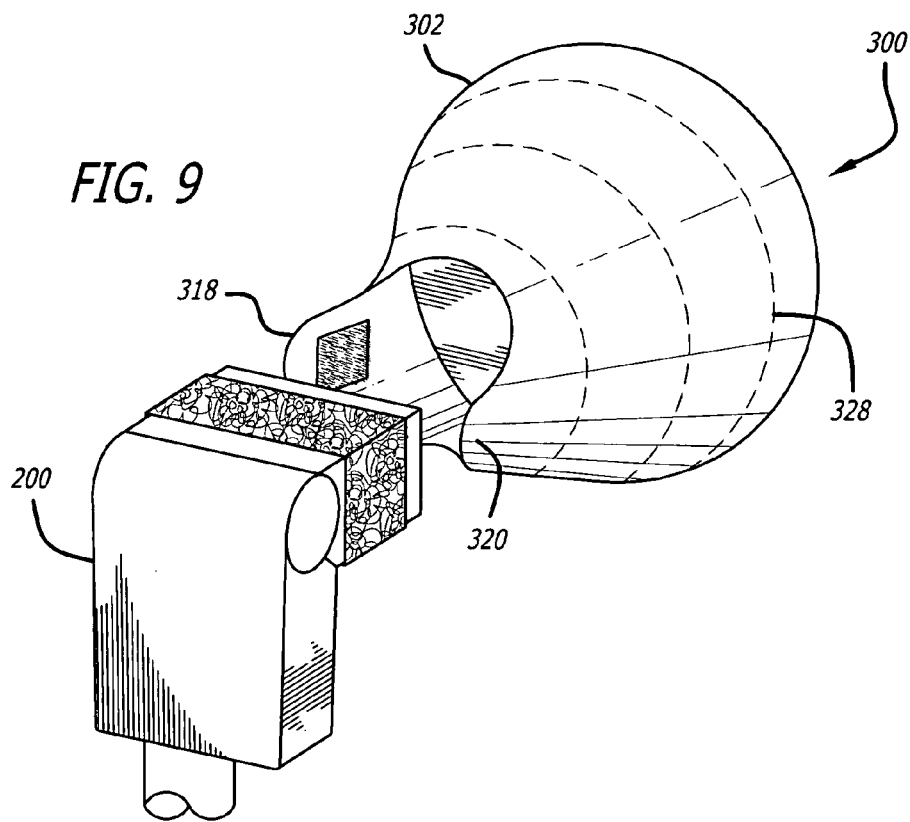
FIG. 9 is a rear perspective view of the softbox and flash housing of FIG. 8.

FIGS. 8 and 9 show another preferred embodiment of a collapsible softbox 300 detachably engageable to flash housing 200. The structure of softbox 300 is similar to that of softbox 100, so unless otherwise noted, the description of softbox 100 will be understood to apply to softbox 300 as appropriate. Softbox 300 includes a body 302, a front panel 312, opposed tabs 318 and 320, and an internal conical helix 328. Softbox 300 is different than softbox 100 in that rather than having a removable front panel and side panels that collapse toward each other, front panel 312 may be permanently attached and body 302 collapses toward front panel 312 for easy storage and transport. A further difference is that rather than having side panels with a semi-rigid layer, body 302 has an internal conical helix 328 between layers. Internal conical helix 328 resiliently expands body 302 to an expanded position, and allows body 302 to be compressed into a collapsed position when in a compressed state. Internal conical helix 328 may be formed as a metallic or plastic wire. Softbox 300 allows for a faster set up and smaller storage space.

The softbox of the present invention may be made of a variety of materials. For example, the outer layers of the first and second side panels and the body, are preferably made of a durable, natural or synthetic, fabric and are preferably black in color. The inner layers of the side panels and the body, are also made of fabric but are preferably white or silver in color so as to reflect light. The combination of the inner and outer layers of the side panels and the body are preferable opaque. The middle layer of the side panels are preferably made of plastic, but may be made of cardboard, or any other suitable material. The front panels are preferably made of a translucent white fabric, but may come in a variety of colors to create different lighting conditions.

Preferred dimensions are set forth below, although it will be appreciated that those dimensions are representative only, and therefore, may be varied as suitable for the intended application. Softbox 100 preferably has a maximal length of approximately 24 cm from distal opening 108 to the end of tabs 118, 120, and a minimal length from distal opening 108 to proximal opening 110 of approximately 18.5 cm. Distal opening 108 and front panel 112 preferably have a diameter in the range of approximately 21 to 22.5 cm, while proximal opening 110 is preferably approximately 8 cm. Fastener 114 is preferably approximately 1 cm wide, while fastener 116 is preferably approximately 2 cm wide. Opposing tabs 118 and 120 are preferably approximately 4 to 5 cm long.

Having described preferred components of softbox 100, a preferred method of use will now be described with reference to FIGS. 1 to 7. To use softbox 100 to soften a flash, a user preferably expands body 102 from the collapsed position, where body 102 is substantially flat, to the expanded position, where body 102 forms a generally frusto-conical shape with open proximal end 110 being smaller than open distal end 108. The user then removeably engages front panel 112 to distal opening 108 so that body 102 is maintained in the expanded position. Finally, the user removeably engages proximal opening 110 of body 102 to flash housing 200 by engaging fasteners 204 and 206. The expanded position of body 102 may be maintained without using any support rods or other inflexible support structure. The method may further include attaching front panel 112 by engaging front panel 112 to distal opening 108 of body 102 via hook and loop fasteners 114 and 116.

A preferred method for use of softbox 300 will now be described with reference to FIGS. 8 and 9. To use softbox 300 to soften a flash, a user preferably expands body 302 from the collapsed position to the expanded position, forming a generally frusto-conical shape, by releasing a compressive force maintaining helix 328 in the compressed state. The user then attaches a proximal end of body 302 to flash housing 200 by engaging fasteners 204 and 206.

It will be appreciated that the steps described above may be performed in a different order, varied, or some steps omitted entirely without departing from the scope of the present invention.

The foregoing description is by way of example only, and may be varied considerably without departing from the scope of the present invention. For example only, the fastener may be permanently attached to the flash housing. The front panel may be attached to the body using a zipper, snaps, buttons, magnets, any other means of cooperative engagement, or any combination thereof. Furthermore, the front panel may be attached to the body through the use of an elastomeric member which is stretched to fit over the distal end of the body, wherein the uniform inward force produced by the elastomeric member maintains the expanded position of the body. In addition, the softbox may also be attached to the flash housing any means for cooperative engagement suitable for the intended purpose.

The body may be formed to assume a variety of shapes in the expanded position, for example only, circular, oval, and other similar shapes. The first and second panels may be seamlessly attached if desired, or the body can be formed as a unitary structure. The front panel may be rigid, semi-rigid, plastic, and/or colored. The front panel may be more opaque in the center in order to block more light directly in front of the light source. The fastener may extend completely around the perimeter of the front panel, or only a portion therearound. The softbox may include means for redirecting the light, for example, by placing an opaque or reflective insert between the light source and the front panel. The bottom of the softbox may include a cutout so as to not interfere with the autofocus or exposure sensors. The softbox may include a case designed for transporting the softbox therein.

The present invention in a preferred form provides the advantages of increased portability and durability, while producing a desirably shaped catchlight.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A collapsible softbox for use with a photographic flash, said softbox comprising:
   a body having a first side panel and a second side panel, said first and second side panels being connected together, said first and second side panels being moveable from a collapsed position wherein said first and second side panels are substantially flat to an expanded position wherein said first and second side panels are at least in part curved, said body having a distal opening and a proximal opening in the expanded position, said distal opening having a curved perimeter in the expanded position; and
   a front panel having a curved perimeter, said front panel being detachably engageable with the perimeter of said distal opening of said body, said front panel, with the curved perimeter of said front panel engaged to a majority of the perimeter of said distal opening, maintaining said body in the expanded position.

2. The softbox of claim 1, wherein said softbox excludes rods in the expanded position.

3. The softbox of claim 1, wherein each of said first and second side panels of said body comprises an inner layer, a middle layer and an outer layer, said middle layer being more rigid than said inner and outer layers.

4. The softbox of claim 1, wherein said body forms a generally frusto-conical shape in the expanded position.

5. The softbox of claim 1, wherein said distal opening is larger than said proximal opening.

6. The softbox of claim 1, wherein said front panel has a circular perimeter.

7. The softbox of claim 1, wherein the perimeters of said front panel and said distal end of said body include hook and loop fasteners for cooperable engagement with each other.

8. The softbox of claim 1, where said front panel is engageable around the entire perimeter of said distal end of said body.

9. The soft box of claim 1, wherein said body includes a pair of opposed tabs at said proximal end for engagement with a housing containing the photographic flash.

10. The softbox of claim 1, wherein said body has an interior surface that is reflective.

11. A collapsible softbox for use with a photographic flash, said softbox comprising:
   a body having opposed hinges connecting first and second portions, said first and second portions being moveable from a collapsed position wherein said first and second portions are substantially flat to an expanded position wherein said first and second portions are at least in part curved, said body having a distal opening and a proximal opening in the expanded position, said distal opening having a curved perimeter in the expanded position; and
   a front panel having a curved perimeter, said front panel being detachably engageable with the perimeter of said distal opening of said body, said front panel when engaged to a majority of the perimeter of said distal opening maintaining said body in the expanded position.

12. The softbox of claim 11, wherein said hinges are living hinges.

13. The softbox of claim 11, wherein said hinges are formed by said portions being sewn together.

14. The softbox of claim 11, wherein said softbox excludes rods in the expanded position.

15. The softbox of claim 11, wherein each of said first and second portions of said body comprises an inner layer, a middle layer and an outer layer, said middle layer being more rigid than said inner and outer layers.

16. The softbox of claim 11, wherein said body forms a generally frusto-conical shape in the expanded position.

17. The softbox of claim 11, wherein said distal opening is larger than said proximal opening.

18. The softbox of claim 11, wherein said front panel has a circular perimeter.

19. The softbox of claim 11, wherein the perimeters of said front panel and said distal end of said body include hook and loop fasteners for cooperable engagement with each other.

20. The softbox of claim 11, where said front panel is engageable around the entire perimeter of said distal end of said body.

21. The soft box of claim 11, wherein said body includes a pair of opposed tabs at said proximal end for engagement with a housing containing the photographic flash.

22. The softbox of claim 11, wherein said body has an interior surface that is reflective.

23. A method for softening the flash from a camera, the method comprising:
   expanding a body of a softbox from a collapsed position wherein the body is substantially flat to an expanded position wherein the body forms a generally frusto-conical shape with an open distal end and an open proximal end that is smaller than the distal end;
   removeably engaging a front panel to the distal end so that once the front panel is attached to the body, the body is maintained in the expanded position; and
   removeably engaging the proximal end of the body to a structure housing the flash.

24. The method of claim 23, wherein the expanded position of the body is maintained without using any support rods.

25. The method of claim 23, wherein the attaching of the front panel includes engaging the front panel to the distal end of the body via hook and loop fasteners.

* * * * *

UNITED STATES PATENT AND TRADEMARK OFFICE
CERTIFICATE OF CORRECTION

| | | |
|---|---|---|
| PATENT NO. | : 7,978,971 B1 | Page 1 of 1 |
| APPLICATION NO. | : 12/661954 | |
| DATED | : July 12, 2011 | |
| INVENTOR(S) | : David Honl | |

It is certified that error appears in the above-identified patent and that said Letters Patent is hereby corrected as shown below:

Title Page, Item (56) References Cited:
Other Publications, line 16: change "=36628tbl" to -- =3662&tbl= --.

Signed and Sealed this
Twenty-third Day of August, 2011

David J. Kappos
*Director of the United States Patent and Trademark Office*